UNITED STATES PATENT OFFICE.

CHARLES H. CAMPBELL, OF CHICAGO, ILLINOIS, ASSIGNOR TO AMERICAN GLUE COMPANY, OF BOSTON, MASSACHUSETTS, A CORPORATION OF MASSACHUSETTS.

RETARDER FOR PLASTER.

1,106,777. Specification of Letters Patent. Patented Aug. 11, 1914.

No Drawing. Application filed May 12, 1910. Serial No. 561,014.

*To all whom it may concern:*

Be it known that I, CHARLES H. CAMPBELL, of Chicago, in the county of Cook and State of Illinois, a citizen of the United States, have invented a new and useful Improvement in Retarders for Plaster, of which the following is a full, clear, and exact description.

My invention relates to a new and useful retarder for plaster and the like especially calcined gypsum hard wall plaster, and is based upon the discovery that lime wastage from the liming of hides possesses characteristics which make it, after treatment, an excellent retarder if used in sufficient quantity. The action of the lime wastage as a retarder is undoubtedly due at least in part to the presence of coriin, although the inactivity of the lime wastage is probably also a material factor. By the term "coriin" is meant that intercellular substance that is represented by the symbol $C_{30}H_{50}N_{10}O_{15}$, and which occurs in animal hides as the intercellular substance or albuminous cement lying between the fibers or connective tissue. The lime wastage in itself as it comes from the lime vats cannot be used for purposes of a retarder for the reason that it possesses an offensive odor and contains certain insoluble animal matter such as shreds of hide, grease and a small quantity of hair. Accordingly before the wastage can be used for purposes of a retarder it must be treated and the insoluble animal matter therein made soluble, which treatment tends also to purify the entire mass and eliminate the offensive odor. This may be accomplished I have found by heating the wastage at a high continued temperature thereby rendering the lime wastage, which normally contains a large percentage of water, a more active solvent and renders soluble the animal hide and hair impurities above referred to residing in it, which combine with the lime, as it were, to form soluble albuminates. In practice I prefer to heat the wastage placed in a steam-jacketed vat by an application of steam at about 80 lbs. pressure so as to obtain within the vat a temperature of about 275 degrees, which is continued until the conversion of the animal matter or tissue. The process may be expedited by the addition of a suitable alkali, preferably a small percentage of caustic soda. I prefer to add about one per cent. caustic soda to a given amount of wastage on the dry basis. After conversion of the hide shreds and hair the wastage is dried and then ground, the grinding acting to subdivide the lime wastage into fine particles making it more adaptable for the purposes of a retarder.

In the commercial preparation of the lime wastage for purposes of a retarder I add to the lime wastage a certain quantity of hair which will become reduced with the animal impurities in the wastage by the process above indicated and which hair in itself is useful as a retarder when converted. In practice I prefer to add about ten per cent. by weight of hair to a given amount of lime wastage.

In applying the lime wastage as a retarder to calcined gypsum or plaster of Paris, while the amount may be varied, a suitable proportion by weight is 1000 lbs. of gypsum to 150 to 300 lbs. of lime wastage. If additional hair has also been combined by conversion with the lime wastage as aforesaid, then a suitable proportion by weight of the retarder is about 1000 lbs. of gypsum to 15 to 20 lbs. of combined lime wastage and dissolved hair. If thirty per cent. by weight of hair be added to the lime wastage, a relatively less amount of the combined lime wastage and hair need be used, as for example 7 to 12 lbs. to 1000 lbs. of gypsum. The use of the retarder in question does not preclude the use in the gypsum or plaster of any other substance that it may be deemed desirable to combine with it.

A plaster laid with a retarder in accordance with my invention has the characteristic of "spreading long", that is, it is very cohesive when in a wet state preparatory to final crystallization; furthermore, the plaster when set has a very high tensile strength, both of which qualities are advantageous, as is well known to those skilled in the art.

The process recited in this application I have not claimed herein, but have claimed the subject-matter thereof in a separate application filed October 18, 1910, Serial No. 587,647.

Having thus fully described my invention, I claim and desire to secure by Letters Patent of the United States:—

1. A retarder for plaster comprising lime wastage from the liming of hides which is practically free from inert insoluble animal matter.

2. A retarder for plaster comprising lime wastage from the liming of hides which wastage is free from materials having objectionable odors, and practically free from inert insoluble animal matter.

3. A retarder for plaster comprising lime wastage from the liming of hides practically free from insoluble animal matter, said material being in the form of a dry, fine powder.

4. A retarder for plaster comprising the combination of lime wastage from the liming of hides practically free from inert insoluble animal matter, and dissolved hair.

5. A retarder for plaster comprising the combination of lime wastage from the liming of hides practically free from inert insoluble animal matter, and a soluble albuminate.

6. A plaster compound comprising plaster, and a retarder comprising coriin in a soluble form.

7. A compound comprising plaster and a retarder comprising coriin and an alkali.

8. In combination, plaster and lime wastage from the liming of hides, practically free from inert insoluble animal matter.

9. In combination, plaster and lime wastage from the liming of hides practically free from inert insoluble animal matter, and a soluble albuminate.

CHARLES H. CAMPBELL.

Witnesses:
JOHN E. R. HAYES,
M. D. NEWMAN.

Copies of this patent may be obtained for five cents each, by addressing the "Commissioner of Patents, Washington, D. C."